United States Patent [19]

Inomata et al.

[11] Patent Number: 5,068,050
[45] Date of Patent: Nov. 26, 1991

[54] AMORPHOUS OXIDE MAGNETIC MATERIAL

[75] Inventors: Koichiro Inomata, Yokohama; Susumu Hashimoto, Tokyo, both of Japan

[73] Assignee: Kabushiki Kaisha Toshiba, Kawasaki, Japan

[21] Appl. No.: 271,448

[22] Filed: Nov. 15, 1988

[30] Foreign Application Priority Data

Nov. 18, 1987 [JP] Japan ................................ 62-289480
Dec. 11, 1987 [JP] Japan ................................ 62-311879
Jan. 22, 1988 [JP] Japan ................................ 63-10828
Feb. 19, 1988 [JP] Japan ................................ 63-35155

[51] Int. Cl.$^5$ ....................... C01F 17/00; C01G 45/12
[52] U.S. Cl. ................................ 252/62.51; 423/263; 423/599; 428/694
[58] Field of Search ................ 252/62.51; 428/694; 423/599, 263

[56] References Cited

U.S. PATENT DOCUMENTS 2,677,663 5/1954 Jonker et al. ................. 252/62.51
2,703,354 3/1955 Wainer ............................ 423/599

Primary Examiner—Jack Cooper
Attorney, Agent, or Firm—Oblon, Spivak, McClelland, Maier & Neustadt

[57] ABSTRACT

An amorphous oxide magnetic material is represented by a formula $(1-y)[Ln_{1-x}A_xMnO_{3-\delta}] \cdot y[XO]$ wherein x and y fall within the ranges of $0.1 \leq x \leq 1.0$ and $y \leq 0.7$, respectively. Ln represents at least one element selected from the group consisting of Ln and a rare earth element. A represents at least one element selected from the group consisting of Ca, Sr, Ba and Pb, X represents at least one element selected from the group consisting of B, Bi, Si, Mg, Mo, V, Zn, P and Ge, and $\delta$ represents oxygen deficiency and $\delta \leq 1$.

18 Claims, 10 Drawing Sheets

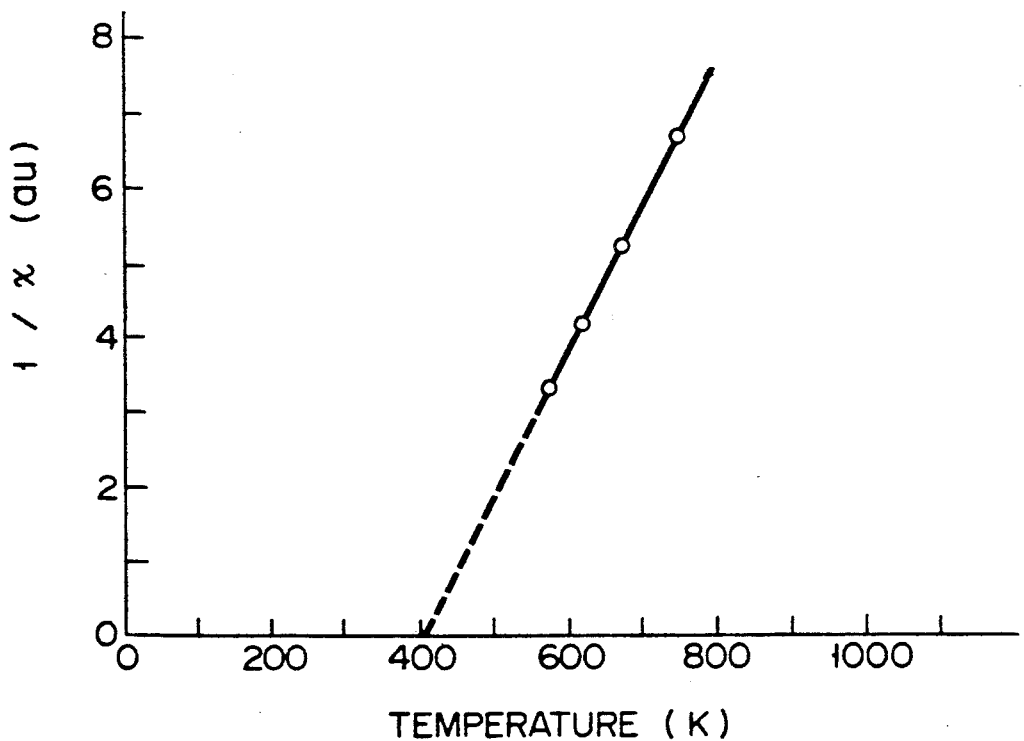
F I G. 5
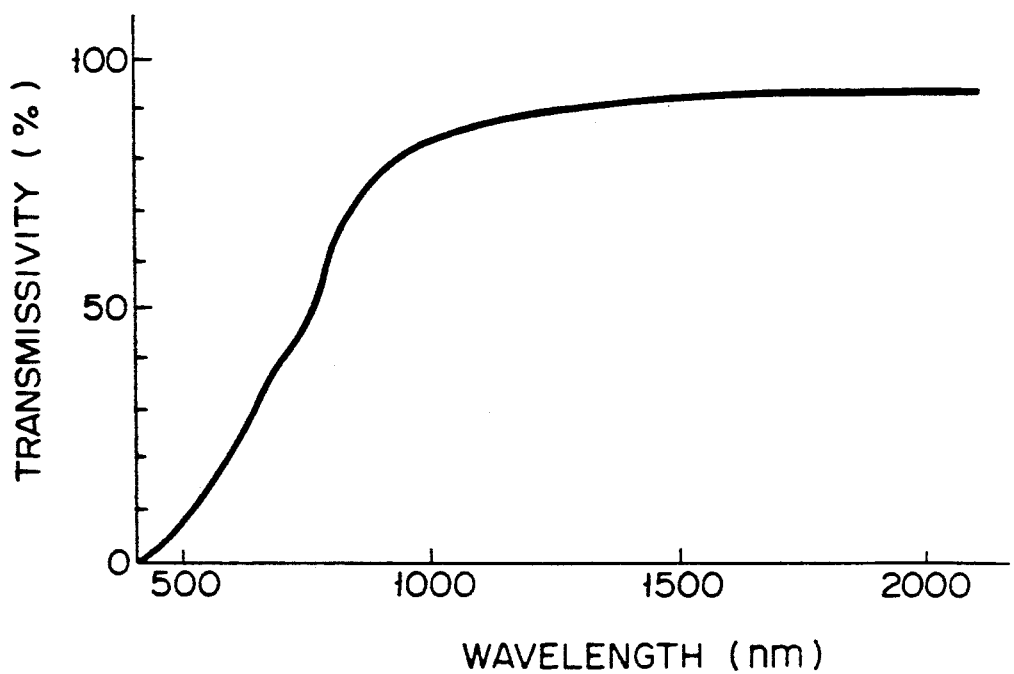
F I G. 6

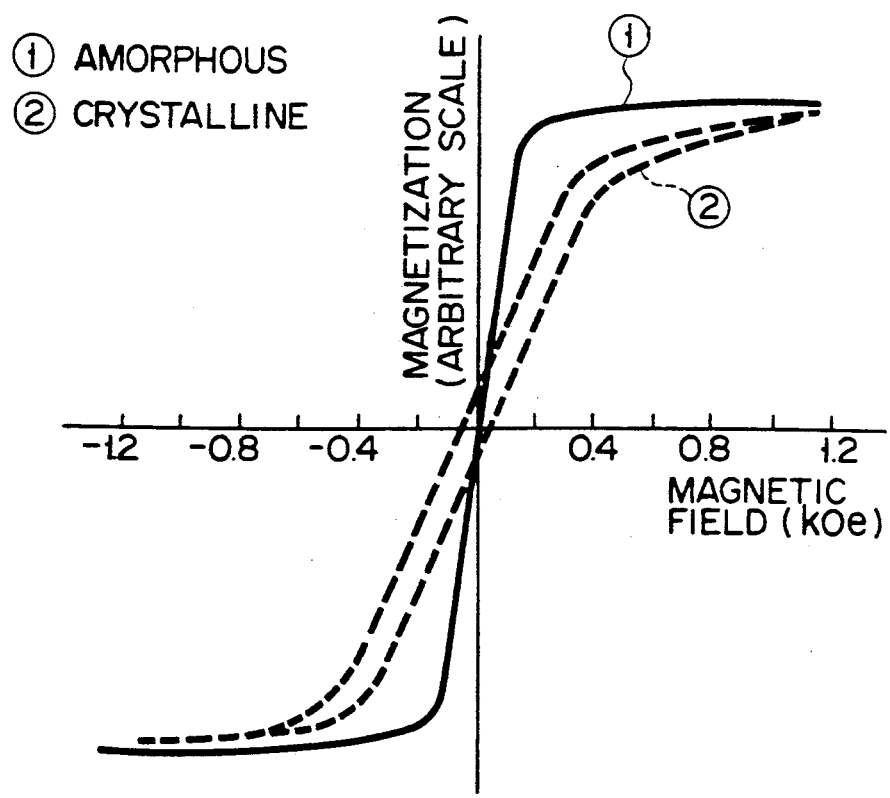
F I G. 9
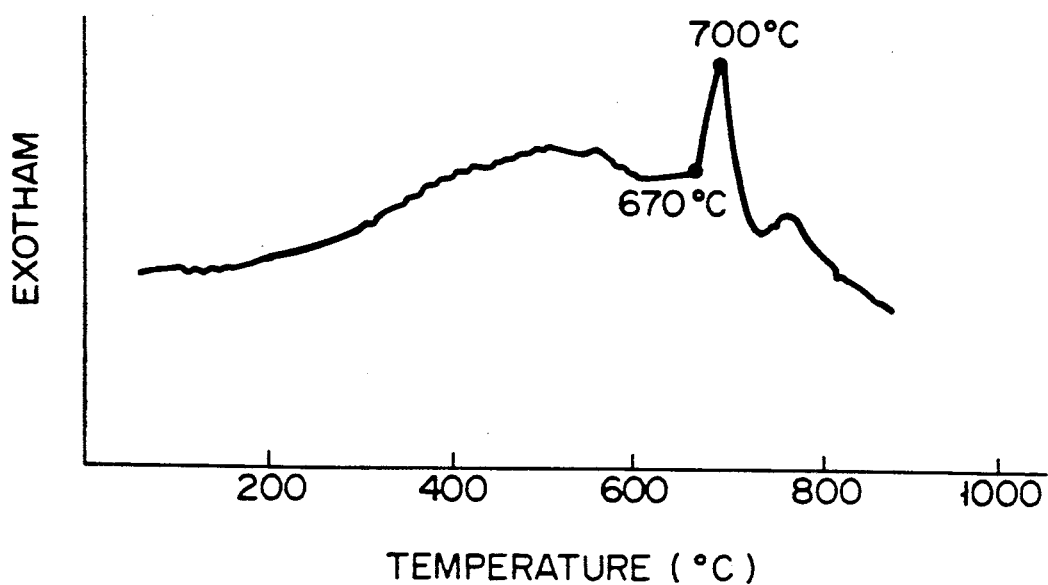
F I G. 10

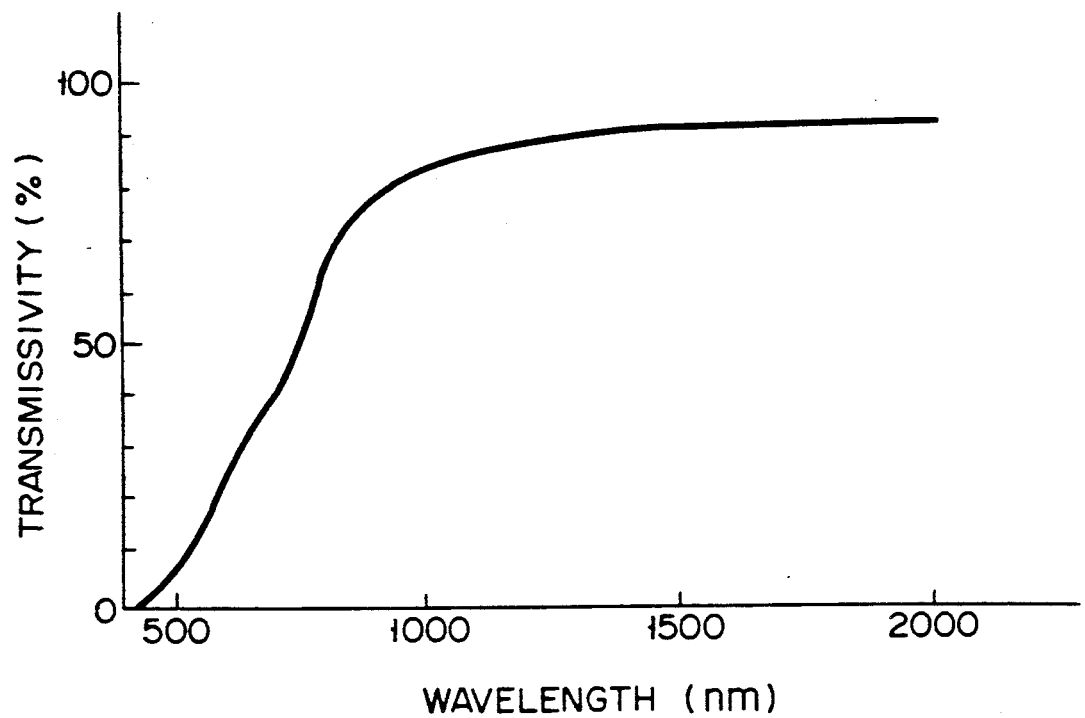
F I G. 11
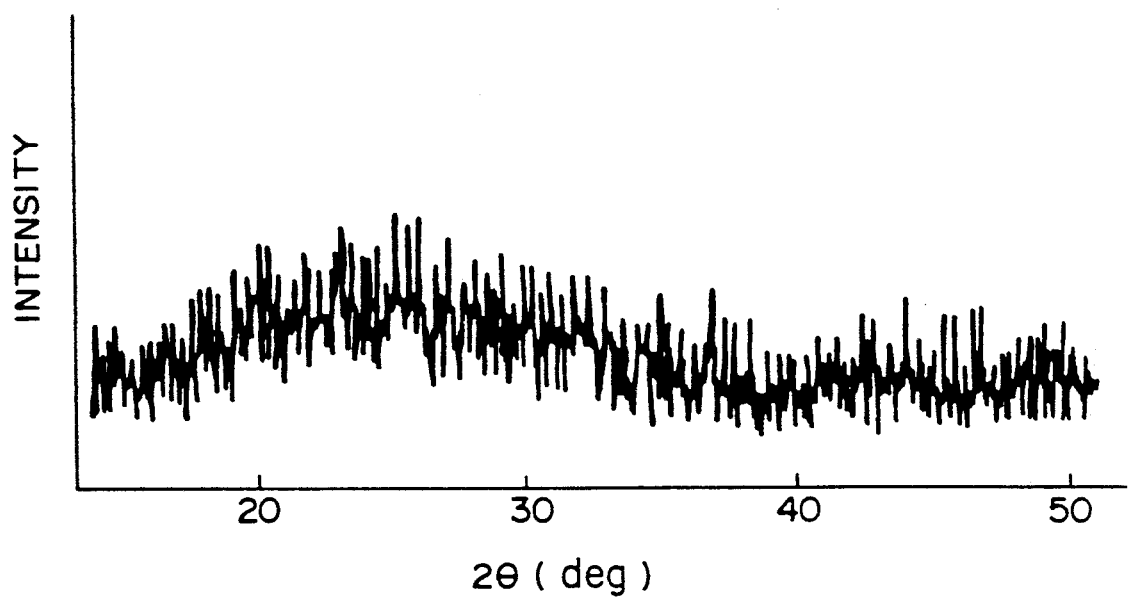
F I G. 12

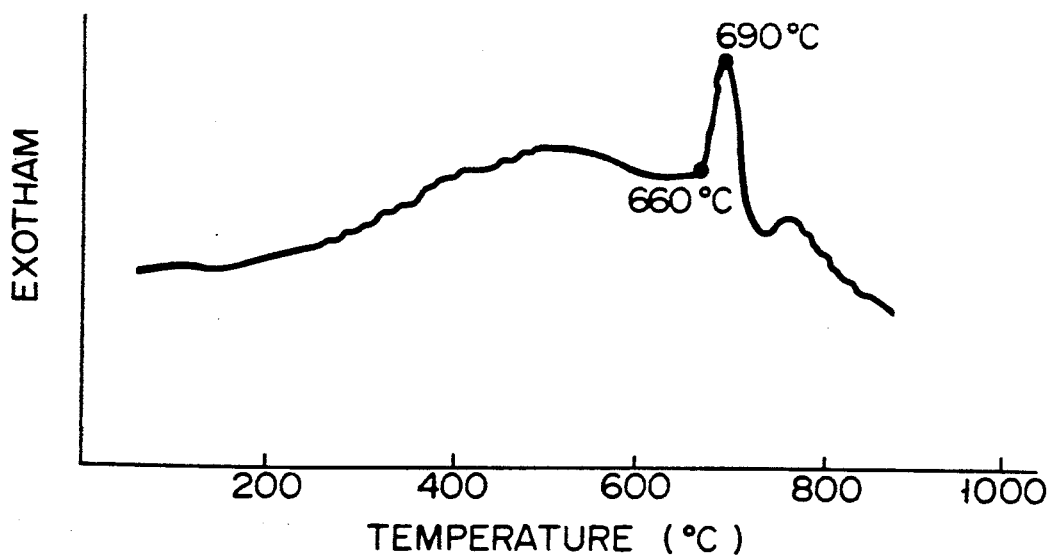
F I G. 15
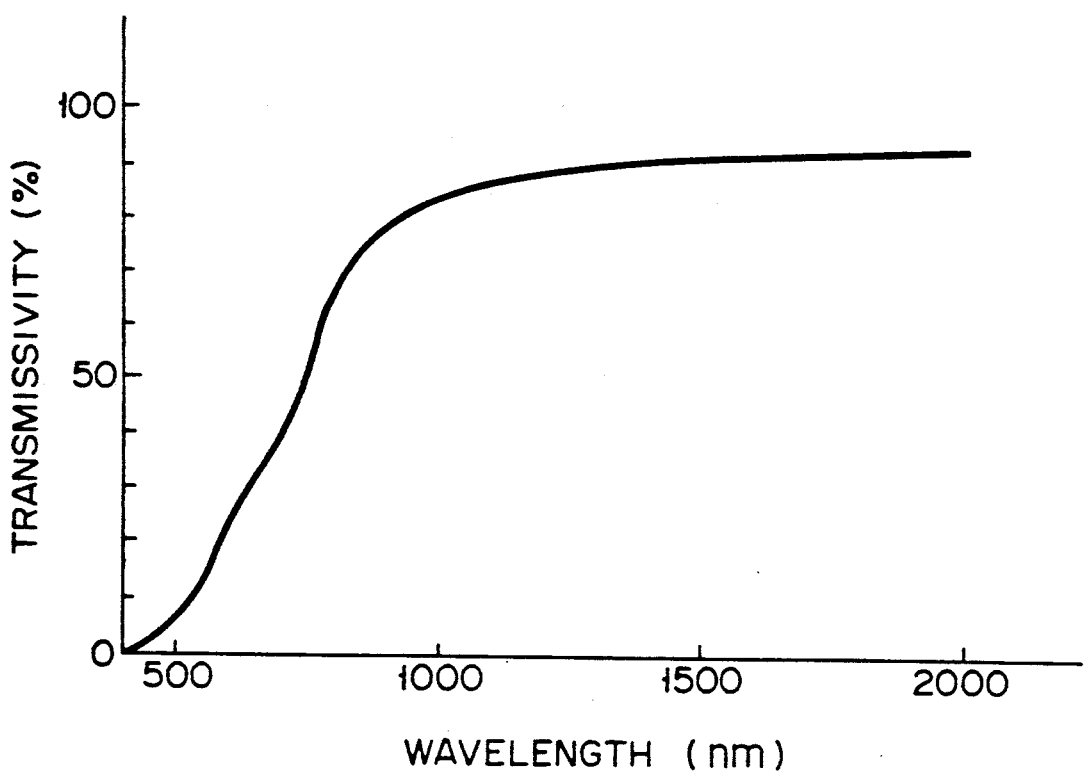
F I G. 16

AMORPHOUS OXIDE MAGNETIC MATERIAL

BACKGROUND OF THE INVENTION

1. Field of the Invention

The present invention relates to an amorphous oxide magnetic material having ferromagnetism.

2. Description of the Related Art

An amorphous magnetic material has physical characteristics not found in a crystal material and therefore is studied at many organizations. A typical example of the amorphous magnetic material is an amorphous magnetic alloy obtained by rapid quenching a melted material formed of a metal element such as Co, Fe, or Ni and a semimetal element such as Si or B. Since the amorphous magnetic material has good magnetic characteristics, it is used in various fields such as a magnetic head and a switching power supply. An amorphous alloy thin film formed of Fe or Co and a rare earth element is widely studied as a magneto-optical recording medium. However, essentially, the amorphous magnetic alloy is easily oxidized and has low stability.

An oxide magnetic material is expected as a highly stable magnetic material. However, not so many oxide magnetic materials having ferromagnetism at room temperature or more have been found.

As examples of the oxide magnetic material having ferromagnetism, $Fe_2O_3$-TO-X (wherein T represents Ca, Ba, Zn, or Mg and X represents $Bi_2O_3$, $B_2O_3$, or $SiO_2$) and $MFe_2O_4$-$P_2O_5$ mainly consisting of spinel $MFe_2O_4$ (wherein M represents Fe, Co, Ni, Mn, Cu, or Mn-Zn) are reported (e.g., Journal of Functional Material, April 1984, p. 1, J. Mag. Mag. Mater. 54–57 (1986)296, Journal of Applied Physics, Vol. 56, No. 5, p. 596). Either of these materials is an amorphous oxide mainly consisting of an oxide of Fe, is attracted to a magnet, and therefore is assumed to be a ferromagnetic material. However, a Möesbauer spectrum of either of the materials exhibits paramagnetism at room temperature. This indicates that these materials do not have a so-called ferromagnetic spin arrangement.

That is, no effective amorphous oxide material having ferromagnetism has been found.

SUMMARY OF THE INVENTION

The present invention has been made in consideration of the above situation and has as its object to provide a novel amorphous oxide magnetic material suitable for practical use.

An amorphous oxide magnetic material according to the present invention comprising: at least one element (represented as Ln) selected from the group consisting of Y and a rare earth element; at least one element (represented as A) selected from the group consisting of Ca, Sr, Ba, and Pb; Mn; at least one element (represented as X) selected from the group consisting of B, Bi, Si, Mg, Mo, V, Zn, P, and Ge; and oxygen, wherein when the amorphous oxide magnetic material is converted to one represented by $(1-y)[Ln_{1-x}A_xMnO_{3-\delta}]\cdot y[XO]$ (wherein XO is an oxide of the X and converted to $B_2O_3$, $Bi_2O_3$, $SiO_2$, $MgO$, $MoO_3$, $V_2O_5$, $ZnO$, $P_2O_5$, or $GeO_2$ and $\delta$ is an oxygen deficiency equal to or less than 1, x and y fall within the ranges of $0.1 \leq x \leq 1.0$ and $y \leq 0.7$, respectively.

In the above composition, 50 at % or less of Mn can be substituted by Co.

Within the above composition range, an amorphous oxide ferromagnetic material can be prepared. Since the magnetic material of the present invention has an amorphous structure, its composition can be changed throughout a wide range. For this reason, a magnetic material having arbitrary magnetic characteristics corresponding to its purpose can be easily prepared. In addition, since the magnetic material of the present invention is an oxide, it has very high stability.

Moreover, since the magnetic material of the present invention is amorphous, it is magnetically and optically isotropic and has no grain boundary. Therefore, no magnetic and optical disturbance is present. Furthermore, the magnetic material has a high specific resistance because it is an oxide. For this reason, the amorphous oxide magnetic material according to the present invention has good characteristics and high light transmissivity as a magnetic material. Therefore, the amorphous oxide magnetic material of the present invention can be widely applied to an RF magnetic core material, an optical isolator, an optical CT, a magneto-optical material such as a magneto-optical recording medium, and the like.

BRIEF DESCRIPTION OF THE DRAWINGS

FIGS. 1, 7, 12 and 18 are graphs showing X-ray diffraction patterns of the amorphous oxide magnetic materials according to examples of the present invention, respectively;

FIGS. 3, 9 and 14 are graphs showing manetization curves of the amorphous oxide magnetic materials according to the examples of the present invention, respectively;

FIGS. 4, 10 and 15 are graphs showing thermal analysis results of the amorphous oxide magnetic materials according to the examples of the present invention, respectively;

FIG. 5 is a graph showing a change in reciprocal of a magnetic susceptivity with respect to temperature in an amorphous oxide magnetic material according to an example of the present invention;

FIGS. 6, 11 and 16 are graphs showing optical characteristics of the amorphous oxide magnetic materials according to the examples of the present invention, respectively.

DETAILED DESCRIPTION OF THE PREFERRED EMBODIMENT

Figure 1:
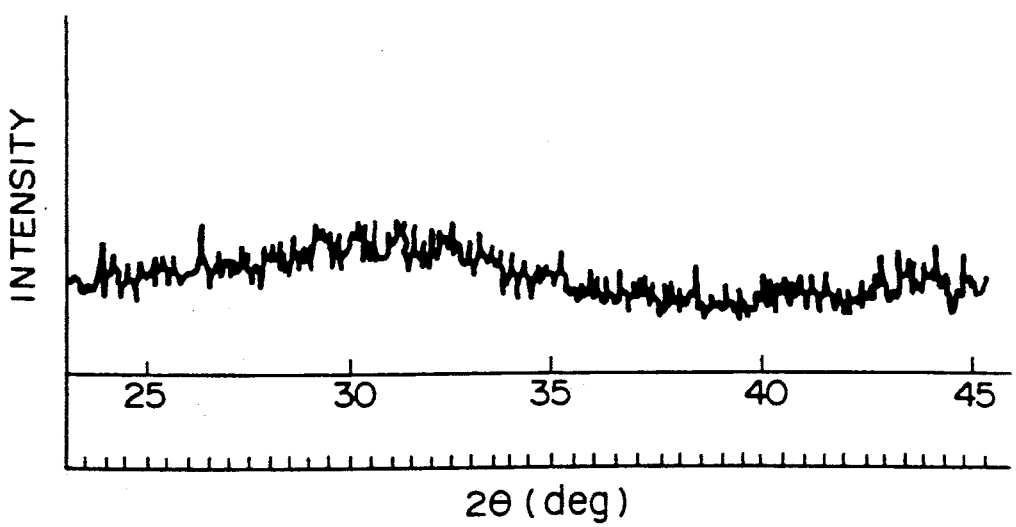

The present invention will be described in detail below.

The amorphous oxide magnetic material of the present invention can be represented by formula

wherein x and y fall within the ranges of $0.1 \leq x \leq 1.0$ and $y \leq 0.7$, respectively.

In the above formula, Ln represents at least one element selected from Y and a rare earth element, A represents at least one element selected from Ca, Sr, Ba and Pb, X represents at least one element selected from B, Bi, Si, Mg, Mo, V, Zn, P and Ge, XO represents an oxide of an element represented by X and is converted to $B_2O_3$, $Bi_2O_3$, $SiO_2$, MgO, $MoO_3$, $V_2O_5$, ZnO, $P_2O_5$ or $GeO_2$, and δ represents an oxygen deficiency which is equal to or less than 1.

An oxide having the above composition range can be in an amorphous state and exhibits ferromagnetism in this state. A composition range is set such that a substantially ferromagnetic perovskite compound $Ln_{1-x}A_xMnO_{3-\delta}$ is precipitated when the oxide is crystallized.

Magnetism of a conventional amorphous oxide magnetic material is attributed to the super-exchange interaction between Fe ions, with oxygen ions interposed between them. In contrast, the amorphous oxide magnetic material of the present invention is attributed to the double exchange interaction between Mn ions, and mechanisms of magnetism are different from each other in the two materials. That is, the amorphous oxide magnetic material of the present invention is completely different from the conventional one. The magnetism based on the super-exchange interaction of the conventional amorphous oxide magnetic material is anti-ferromagnetism, but that based on the double exchange interaction of the amorphous oxide magnetic material of the present invention is ferromagnetism.

In the amorphous oxide magnetic material of the present invention, A, O and Mn is an essential elements for obtaining the ferromagnetism, and x in the above formula falls within the range of $0.1 \leq x \leq 1.0$. This is because if x falls outside this range, it is difficult to obtain the ferromagnetism at room temperature or more. If $x > 0.8$, saturation magnetization is lowered. Therefore, the range of x is preferably $x \leq 0.8$, and more preferably, $x \leq 0.6$.

XO in the above formula is an effective component for promoting an amorphous state of the oxide magnetic material. However, a thin film or the like can be obtained as an amorphous state without XO. Amount y of XO falls within the range of $y \leq 0.7$. This is because if y exceeds 0.7, it is difficult to obtain the ferromagnetism at room temperature or more. Preferably, the range of y is $0.1 \leq y \leq 0.5$, and more preferably, $0.2 \leq y \leq 0.5$.

An element represented by Ln is preferably La for obtaining large magnetization. The content of La in the component represented by Ln is preferably 50 at % or more, and more preferably, 70 at % or more.

An XO component is preferably $B_2O_3$ for easily obtaining an amorphous state. The content of $B_2O_3$ in the XO component is preferably 30 at % or more, and more preferably, 50 at % or more. Since $Bi_2O_3$ effectively increases a Faraday rotational angle, it is preferable to add 5 at % or more of $Bi_2O_3$ in the XO component.

A component represented by A is preferably Sr for increasing the saturation magnetization and Curie point. The content of Sr in the A component is preferably 50 at % or more, and more preferably, 70 at % or more.

When Mn in the above oxide magnetic material is partially substituted by Co, a magnetic coercive force is increased. Therefore, in a field wherein a magnetic recording medium or the like must have a high magnetic coercive force, it is preferable to partially substitute Mn in the oxide by Co. However, if a substitution amount is too large, the Curie point is lowered outside the range of practical use. Therefore, practically, the substitution amount of Co is preferably 50 at % or less. Such an oxide is represented in the same manner as the above oxide by the following formula:

$$(1-y)[Ln_{1-x}A_xMn_{1-z}Co_zO_{3-\delta}] \cdot y(XO)$$

(wherein x, y and z fall within the ranges of $0.1 \leq x \leq 1.0$, $y \leq 0.7$ and $z \leq 0.5$, respectively).

In the amorphous oxide magnetic material of the present invention, an oxygen amount more or less changes in accordance with manufacturing conditions and the like. In some cases, the oxygen deficiency represented by δ as described above occurs.

The amorphous oxide according to the present invention has high light transmissivity especially from a visible range to an infrared range. A crystallization temperature of the amorphous oxide of the present invention is about 550° C. or more (e.g., 650° C.) which is higher than 400° C. of the conventional $Fe_2O_3$-TO-X and spinel amorphous oxides. That is, thermal stability of the amorphous oxide of the present invention is high.

In addition, characteristics such as the magnetic coercive force and Curie point of the amorphous oxide of the present invention can be widely changed in correspondence with requirements by adjusting the composition. For example, if Mn in $(1-y)[Ln_{1-x}A_xMnO_{3-\delta}] \cdot y[XO]$ which is likely to have a relatively small coercive force, and thus soft magnetism, is partially replaced by Co, the resultant material will have a large coercive magnetic force, and hence hard magnetism. The hard magnetism is suitable for an information recording medium and the like.

The amorphous oxide magnetic material according to the present invention can be manufactured by conventional methods of manufacturing an amorphous material, e.g., a liquid quenching method such as a twin roll method and a singleroll method, and a mechanical alloy method.

A method of manufacturing the amorphous oxide magnetic material of the present invention by liquid quenching will be described below in detail. First, oxides of Ln, A, X and Mn or carbonates, nitrates and the like (e.g., $La_2O_3$, $MnCO_3$, $CaCO_3$, $SrCO_3$, $BaCO_3$, PbO and $B_2O_3$) which are converted into oxides upon sintering these elements are mixed at predetermined mixing ratios, and the resultant mixture is presintered at a temperature near a melting point of the mixture, thereby preparing composition $(1-y)[Ln_{1-x}A_xMnO_{3-\delta}] \cdot y(XO)$. Then, the composition is charged in a crucible and melted in the atmosphere at a temperature higher than a melting point of the composition by 50° to 200° C. The resultant melted material is sprayed on a high-speed rotary roll (twin rolls or a singleroll) by a high-pressure gas (air, Ar gas or the like) and quenched at a cooling rate of about $10^{4°}$ to $10^{7°}$ C./sec, thereby preparing a ribbon-like amorphous oxide.

In this case, an amorphous state can be easily obtained when the thickness of the ribbon is 40 μm or less. If the ribbon is thicker than this value, it is partially crystallized.

A method of manufacturing the amorphous oxide magnetic material by vapor phase quenching, e.g., sputtering will be described below. First, composition $(1-y)[Ln_{1-x}A_xMnO_{3-\delta}] \cdot y(XO)$ is prepared to be used as a target for sputtering. The target is fixed at a predetermined position of a sputtering apparatus, and a substrate is placed at a position opposing the target. Then, the apparatus is evacuated to a degree of vacuum of $1 \times 10^{-4}$ Torr or more, and oxygen gas and Ar gas are supplied into the apparatus so that the interior of the apparatus is held in a gas mixture atmosphere at a pressure of about $10^{-3}$ Torr. Thereafter, a voltage is applied between the target as a cathode and the substrate as an anode. As a result, discharge is generated between the target and substrate, and Ar or oxygen ions collide against the target to start reaction sputtering, thereby depositing a film having a desired composition on the substrate. The composition of the deposited film is sometimes different from that of the target. In this case, the composition of the target is changed so that the composition of the film becomes a desired one.

A magnetic core made of the amorphous oxide magnetic material of the present invention will be described below.

A conventional magnetic core employs a so-called soft magnetic material such as permalloy, soft ferrite, Sendust, and an amorphous alloy. However, permeability of these material except for soft ferrite is largely reduced in an RF range, especially in a range of more than 1 MHz because they are metal materials. Since a specific resistance of soft ferrite is high, its frequency characteristic is good. However, the permeability of soft ferrite is originally not much high.

On the contrary, the amorphous oxide magnetic material according to the present invention has high permeability even in the RF range. Therefore, a magnetic core with good characteristics for an RF application can be obtained from the amorphous oxide magnetic material of the present invention.

In order to manufacture the magnetic core of the present invention, an amorphous oxide magnetic material thin film is formed on a substrate by sputtering or the like, and a coil is wound around the core or a conductive pattern corresponding to a coil is formed on the core. If necessary, an insulating layer may be formed between the substrate and the magnetic material thin film.

Alternatively, the core of the present invention can be formed by milling the amorphous oxide magnetic material obtained by liquid quenching and molding the milled product. In this case, any of methods of milling a ceramic material such as a ball mill, a jet mill, and a vibration mill can be used as a milling means.

In order to manufacture a magnetic core from an amorphous oxide powder prepared as described above, the powder is mixed with a resin serving as a binder such as epoxy or nylon or a glass powder and the resultant mixed material is molded into a predetermined shape. Molding can be performed by high pressure compression, injection molding, heating at a temperature lower than a crystallization temperature, or the like.

The core manufactured as described above is very effective as an RF core for an RF transformer or inductance.

An information recording medium formed of the amorphous oxide magnetic material of the present invention will be described below.

Generally, a magnetic material thin film having an axis of easy magnetization in a direction perpendicular to a film surface and a Curie point higher than a room temperature can be used as a high-density perpendicular magnetic recording medium or a high-density magneto-optical recording medium for using an optical beam such as a laser beam to record/reproduce information. Examples of the recording medium are polycrystalline thin films such as Co-Cr, Ba ferrite and MnBi, compound monocrystalline thin films such as GdIG (gadolinium iron garnet), and rare earth-iron amorphous alloy thin films such as Tb-Fe, Gd-Co, Tb-Co and Tb-Fe-Co.

The polycrystalline thin film of, e.g., MnBi is heated to the Curie point (Tc) to write information therein. However, since the Curie point is as high as Tc≈about 360° C., a high energy is required for a writing operation. In addition, since a polycrystalline material is used, this thin film must have a stoichiometric composition. Therefore, it is difficult to manufacture the polycrystalline thin film.

The thin film of, e.g., GdIG is deposited on a GGG (gadolinium gallium garnet) monocrystalline substrate. Therefore, magnetic characteristics are easily adversely affected by the state of the substrate, and it is difficult to form a substrate having a large area.

The rare earth-iron amorphous alloy thin film (RE-TM film) of, e.g., Gd-Co and Tb-Fe has various advantages that a magnetic material thin film having an arbitrary size can be formed, a composition can be easily controlled, and an S/N ratio of a reproduced signal is high because no grain boundary is present. Therefore, the RE-TM film is studied as an magneto-optical recording medium at many organizations. However, a Faraday effect and a Kerr effect as magneto-optical effects of the RE-TM thin film are small, its C/N ratio is not sufficient, and its corrosion resistance is poor.

On the contrary, the amorphous oxide magnetic material according to the present invention has high light transmissivity especially from a visible range to an infrared range. In addition, a perpendicular magnetic film having a high magnetic coercive force of 1 kOe or more and therefore effective as an magneto-optical recording medium can be made from the amorphous oxide magnetic material of the present invention. Moreover, since Curie point Tc of the thin film is as comparatively low as about 100° to 170° C., only low laser power is required for writing information in a magneto-optical recording medium. Therefore, a semiconductor laser having relatively low power can be used in an information write operation. The Faraday rotational angle of the amorphous oxide magnetic material of the present invention is as large as $10^4$ deg/cm or more, and its light absorption coefficient is rather small. Therefore, an magneto-optical recording medium having a large C/N ratio can be provided. Furthermore, since this magnetic material is an oxide, it has a high corrosion resistance. Therefore, if a recording medium formed of the magnetic material is used for a long time period, degradation in its characteristics is very small.

Such a medium is preferably manufactured by an evaporation method. Examples of the evaporation method are RF sputtering, DC sputtering, magnetron sputtering, ion beam sputtering, ion plating, ion plating, electron beam evaporation, and vacuum evaporation. The magnetic material thin film formed by the above evaporation method and having a composition falling within the range of the present invention is a perpendicular magnetic film having an axis of easy magnetization in a direction perpendicular to the film surface.

A substrate used in the above medium need only be formed by a nonmagnetic material which is easily molded and does not adversely affect the magnetic characteristics of the magnetic material thin film as a recording medium. Examples of the material are resins such as vinyl chloride, polycarbonate and acryl, or glass.

EXAMPLES

The present invention will be described below in more detail by way of its examples.

EXAMPLE 1

Figure 2:
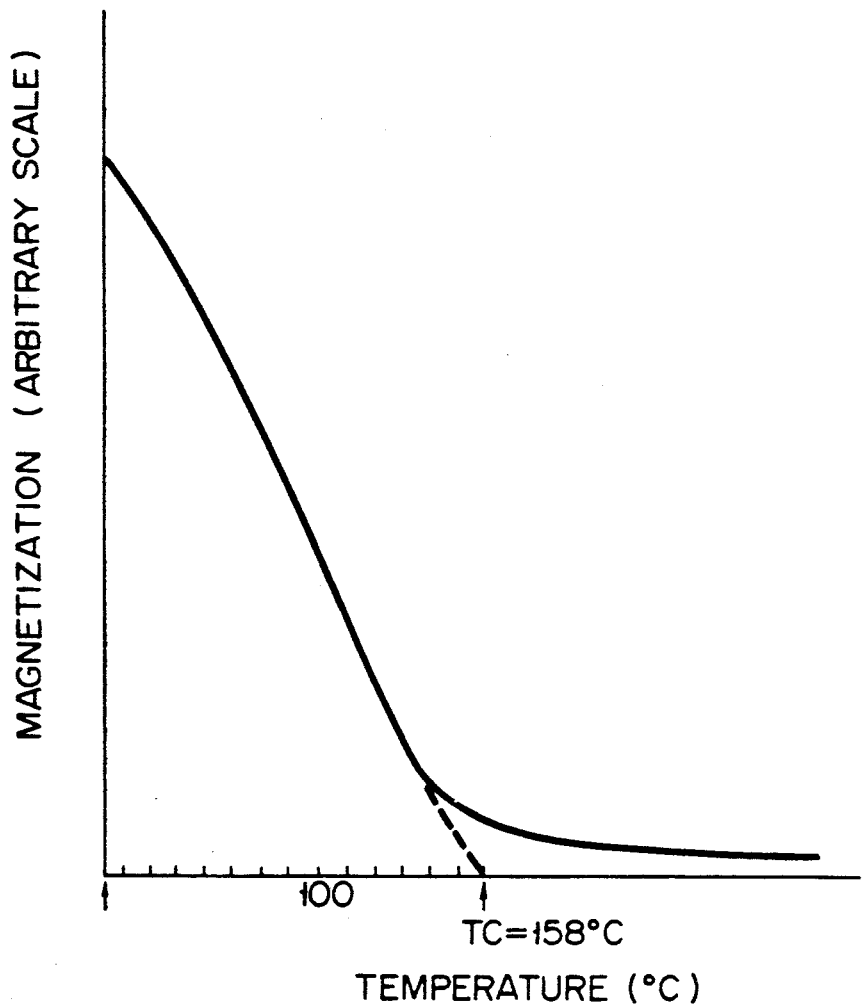
FIGS. 2, 8 and 13 are graphs showing temperature characteristics of magnetization in the amorphous oxide magnetic materials according to the examples of the present invention, respectively.

Materials having a purity of 99.9% were mixed at mixing ratios listed in Table 1 and presintered. Then, the presintered material was melted in a platinum crucible having a diameter of 1 mm by RF heating and injected between high-speed twin rolls by argon gas having a pressure of 0.5 kg/cm$^2$. Although the sizes of obtained samples were slightly different from one another, the width was 3 to 10 mm, the length was 10 to 40 mm, and the thickness was 10 to 20 μm. All the samples were translucent and had a dark brown color. Each sample was confirmed to be amorphous by powder X-ray diffraction. Table 1 shows values of magnetization and the Curie point measured by a VSM (vibration sample magnetometer). The result of powder X-ray diffraction for 0.5[La$_{0.7}$Sr$_{0.3}$MnO$_3$]-0.5B$_2$O$_3$ of Sample 1 is shown in FIG. 1. A change in magnetization of Sample 1 with respect to temperature measured by a VSM is shown in FIG. 2. The Curie points listed in Table 1 were obtained by this change in magnetization with respect to temperature.

Note that although an oxygen deficiency may occur in each sample of Table 1 in accordance with manufacturing conditions, it is omitted in Table 1. This also applies to Tables to be presented below.

As is apparent from Table 1, the amorphous oxide of the present invention has large magnetization at room temperature or more.

Figure 3:
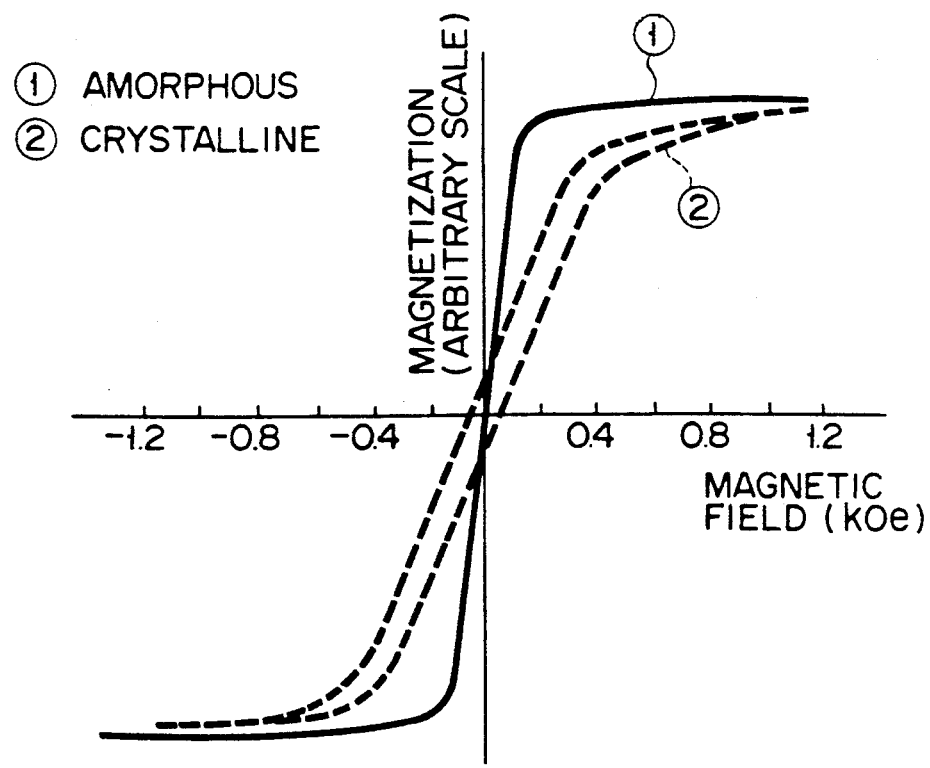

FIG. 3 shows a magnetization curve of the samples of Example 1 measured by the VSM as compared with that of crystalline La$_{0.7}$Sr$_{0.3}$MnO$_3$. As is apparent from FIG. 3 rise of magnetization of the amorphous oxide is faster, and its magnetic coercive force is smaller.

Figure 4:
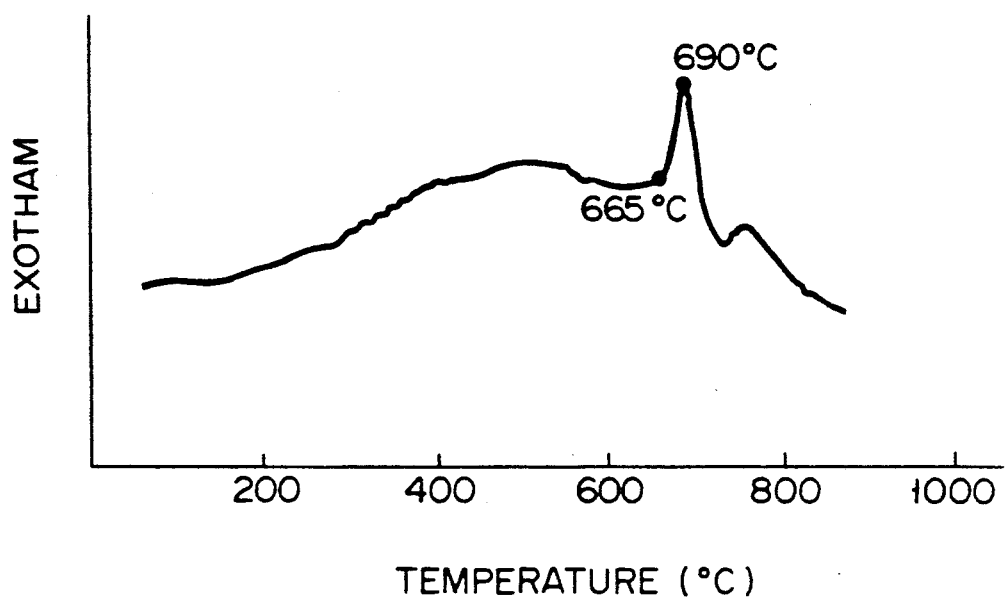

FIG. 4 shows a DTA (differential thermal analysis) measurement result of Sample 3. As is apparent from FIG. 4, a crystallization temperature is as very high as 665° C.

A relationship between a temperature and a reciprocal (1/χ) of magnetic susceptivity of Sample 3 is as shown in FIG. 5. As is apparent from FIG. 5, since a temperature at which 1/χ was 0, i.e., paramagnetic Curie point $θ_p$ was positive, this magnetic material was confirmed to be a ferromagnetic material. This also applied to the other samples.

TABLE 1

| Sample No. | Conmposition | Magnetization at. R. T. (emu/g) | Curie point (°C.) |
|---|---|---|---|
| 1 | 0.9 [La$_{0.7}$ Sr$_{0.3}$ MnO$_3$].0.3(B$_2$O$_3$) | 25.5 | 165 |
| 2 | 0.6 [La$_{0.7}$ Sr$_{0.3}$ MnO$_3$].0.4(B$_2$O$_3$) | 22.0 | 160 |
| 3 | 0.5 [La$_{0.7}$ Sr$_{0.3}$ MnO$_3$].0.5(B$_2$O$_3$) | 13.4 | 158 |
| 4 | 0.6 [La$_{0.9}$ Sr$_{0.1}$ MnO$_3$].0.4(B$_2$O$_3$) | 18.5 | 110 |
| 5 | 0.6 [La$_{0.5}$ Sr$_{0.5}$ MnO$_3$].0.4(B$_2$O$_3$) | 15.0 | 120 |
| 6 | 0.7 [La$_{0.7}$ Ba$_{0.3}$ MnO$_3$].0.3(B$_2$O$_3$) | 24.5 | 140 |
| 7 | 0.6 [La$_{0.7}$ Ba$_{0.3}$ MnO$_3$].0.4(B$_2$O$_3$) | 21.0 | 130 |
| 8 | 0.5 [La$_{0.7}$ Ba$_{0.3}$ MnO$_3$].0.5(B$_2$O$_3$) | 14.5 | 125 |
| 9 | 0.6 [La$_{0.8}$ Ba$_{0.2}$ MnO$_3$].0.4(B$_2$O$_3$) | 12.8 | 110 |
| 10 | 0.6 [La$_{0.5}$ Ba$_{0.5}$ MnO$_3$].0.4(B$_2$O$_3$) | 10.5 | 100 |
| 11 | 0.7 [La$_{0.7}$ Ca$_{0.3}$ MnO$_3$].0.3(B$_2$O$_3$) | 24.0 | 110 |
| 12 | 0.6 [La$_{0.7}$ Ca$_{0.3}$ MnO$_3$].0.4(B$_2$O$_3$) | 21.5 | 100 |
| 13 | 0.5 [La$_{0.7}$ Ca$_{0.5}$ MnO$_3$].0.5(B$_2$O$_3$) | 13.0 | 100 |
| 14 | 0.5 [La$_{0.7}$ Pb$_{0.3}$ MnO$_3$].0.5(B$_2$O$_3$) | 9.5 | 70 |
| 15 | 0.5 [La$_{0.6}$ Pb$_{0.4}$ MnO$_3$].0.5(B$_2$O$_3$) | 11.0 | 60 |

EXAMPLE 2

In this example, samples were prepared by sputering.

First, materials having a purity of 99.9% were mixed at mixing ratios listed in Table 2 and presintered. Each presintered material was molded and sintered. The sintered material was formed into a disk having a diameter of 5", the surface of the disk was smoothened, and then the disk was placed at a target portion in an RF sputtering apparatus. A glass plate was used as a substrate, and the pressure in the chamber was reduced to $1 \times 10^{-5}$ Torr. Thereafter, a gas mixture of Ar and O$_2$ at a ratio of 1:1 was supplied into the chamber to obtain a pressure of $3 \times 10^{-2}$ Torr. When the gas pressure became constant, a voltage was applied to an RF power source, and sputtering was performed while the substrate was rotated at 10 rpm. In this case, a substrate temperature was not controlled. A prepared film was confirmed to be amorphous by X-ray diffraction. Table 2 shows values of magnetization measured by a VSM.

FIG. 6 shows light transmissivity of Example 1. As is apparent from FIG. 6, an absorption end was 420 nm, i.e., light transmissivity was very high from a visible light range to an infrared range.

TABLE 2

| Sample No. | Composition | Magnetization at. R. T. (emu/g) | Curie point (°C.) |
|---|---|---|---|
| 16 | La$_{0.7}$ Sr$_{0.3}$ MnO$_3$ | 38.0 | 170 |
| 17 | 0.9 [La$_{0.7}$ Sr$_{0.3}$ MnO$_3$].0.1(B$_2$O$_3$) | 35.5 | 170 |
| 18 | 0.8 [La$_{0.7}$ Sr$_{0.3}$ MnO$_3$].0.2(B$_2$O$_3$) | 31.5 | 165 |
| 19 | La$_{0.7}$ Ba$_{0.3}$ MnO$_3$ | 35.5 | 140 |
| 20 | 0.9 [La$_{0.7}$ Ba$_{0.3}$ MnO$_3$].0.1(B$_2$O$_3$) | 33.0 | 135 |
| 21 | 0.8 [La$_{0.7}$ Ba$_{0.3}$ MnO$_3$].0.2(B$_2$O$_3$) | 30.5 | 135 |
| 22 | La$_{0.7}$ Ca$_{0.3}$ MnO$_3$ | 35.0 | 120 |
| 23 | 0.9 [La$_{0.7}$ Ca$_{0.3}$ MnO$_3$].0.1(B$_2$O$_3$) | 32.5 | 115 |
| 24 | 0.8 [La$_{0.7}$ Ca$_{0.3}$ MnO$_3$].0.2(B$_2$O$_3$) | 30.0 | 110 |
| 25 | 0.8 [La$_{0.7}$ Pb$_{0.3}$ MnO$_3$].0.2(B$_2$O$_3$) | 25.0 | 75 |

EXAMPLE 3

Following the same procedures as in Example 1, amorphous oxide magnetic materials listed in Table 3 were prepared. Characteristics of the amorphous oxide magnetic materials are also listed in Table 3.

Following the same procedures as in Example 2, amorphous oxide magnetic material thin films were prepared. The results and characteristics of the amorphous oxide magnetic material thin films are also listed in Table 4.

Figure 7:
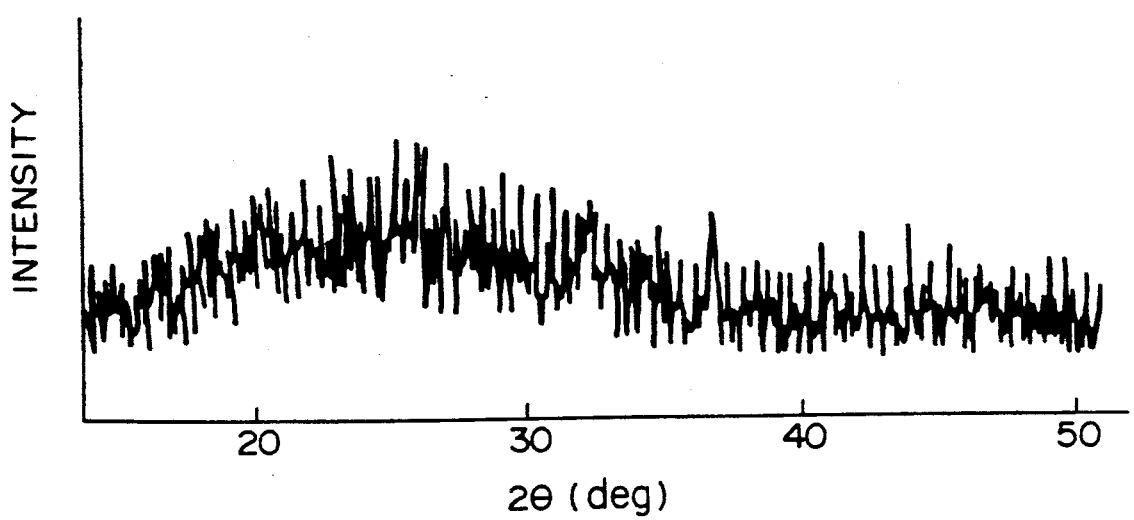
Figure 8:
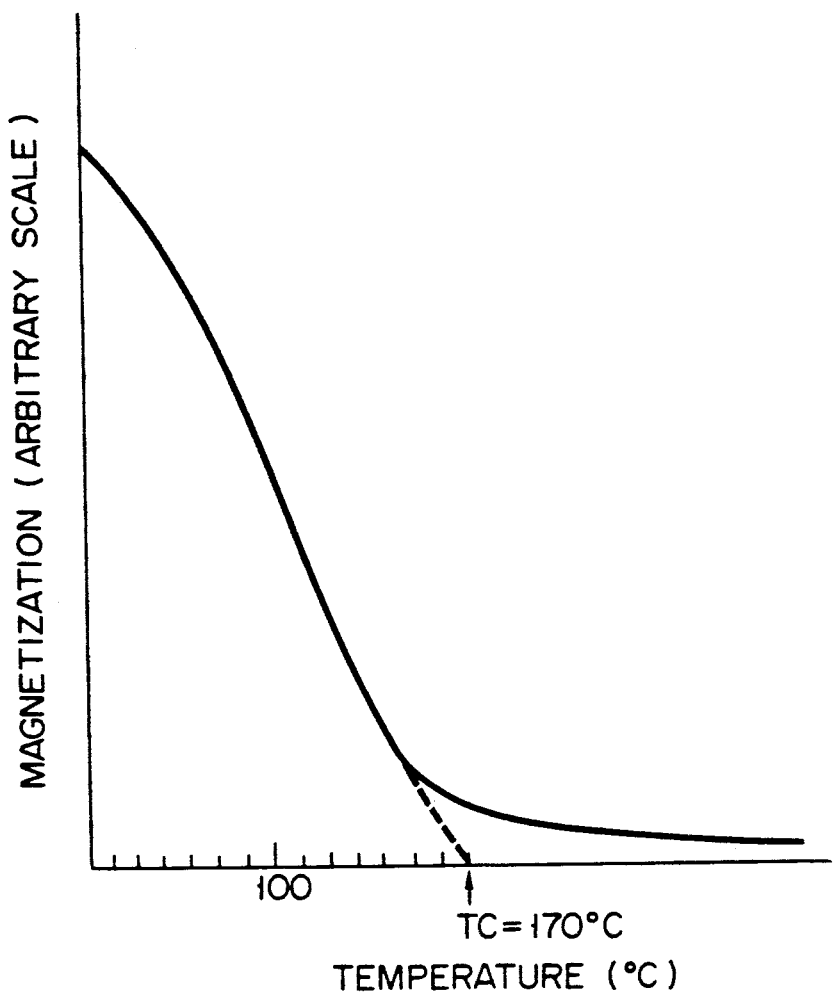

FIG. 7 is a graph showing X-ray diffraction of Sample 31. As is apparent from FIG. 7, Sample 31 had an amorphous structure. FIG. 8 is a graph showing a change in magnetization with respect to temperature of Sample 31 measured by a VSM. FIG. 9 is a graph showing a magnetization curve of Sample 34 measured by a VSM as compared with that of crystalline La$_{0.7}$Sr$_{0.3}$MnO$_3$. As is apparent from FIG. 9, rise of magnetization of the sample of the present invention was faster, and its magnetic coercive force was significantly smaller. FIG. 10 is a graph showing a DTA measurement result of Sample 36. As is apparent from FIG. 10, a crystallization temperature of the sample was as very high as 670° C. FIG. 11 is a graph showing light transmissivity of Sample 46. As is apparent from FIG. 11, the light transmissivity was high from a visible light range to an infrared range.

TABLE 3

| Sample No. | Composition | Magnetization at. R. T. (emu/g) | Curie point (°C.) |
|---|---|---|---|
| 31 | $0.7 [Pr_{0.7} Sr_{0.3} MnO_3].0.3B_2O_2$ | 27 | 170 |
| 32 | $0.7 [Nd_{0.7} Sr_{0.3} MnO_3].0.3B_2O_3$ | 28 | 180 |
| 33 | $0.7 [Sm_{0.7} Sr_{0.3} MnO_3].0.3B_2O_3$ | 24 | 160 |
| 34 | $0.7 [Y_{0.7} Sr_{0.3} MnO_3].0.3B_2O_3$ | 26 | 170 |
| 35 | $0.7 [Gd_{0.7} Sr_{0.3} MnO_3].0.3B_2O_3$ | 15 | 165 |
| 36 | $0.7 [La_{0.5} Dy_{0.2} Sr_{0.3} MnO_3].0.3B_2O_3$ | 20 | 120 |
| 37 | $0.5 [La_{0.5} Y_{0.2} Sr_{0.3} MnO_3].0.5B_2O_3$ | 26 | 160 |
| 38 | $0.5 [La_{0.5} Y_{0.2} Sr_{0.3} MnO_3].0.3B_2O_3.0.2Bi_2O_3$ | 23 | 150 |
| 39 | $0.5 [La_{0.5} Y_{0.2} Sr_{0.3} MnO_3].0.3B_2O_3.0.2ZnO$ | 23 | 150 |
| 40 | $0.5 [La_{0.5} Y_{0.2} Sr_{0.3} MnO_3].0.3B_2O_3.0.2GeO_2$ | 22 | 140 |

TABLE 4

| Sample No. | Composition | Magnetization at. R. T. (emu/g) | Curie point (°C.) |
|---|---|---|---|
| 41 | $La_{0.6} Nd_{0.1} Sr_{0.3} MnO_3$ | 39 | 175 |
| 42 | $0.9 [Nd_{0.7} Sr_{0.3} MnO_3].0.1B_2O_3$ | 36 | 170 |
| 43 | $0.8 [Pr_{0.7} Sr_{0.3} MnO_3].0.2B_2O_3$ | 34 | 165 |
| 44 | $0.8 [Y_{0.7} Sr_{0.3} MnO_3].0.2B_2O_3$ | 32 | 160 |
| 45 | $0.8 [Y_{0.7} Sr_{0.3} MnO_3].0.1B_2O_3.0.1Bi_2O_3$ | 30 | 150 |
| 46 | $0.8 [La_{0.5} Y_{0.2} Sr_{0.3} MnO_3].0.1B_2O_3.0.1Bi_2O_3$ | 28 | 150 |

EXAMPLE 4

Following the same procedures as in Example 1, amorphous oxide magnetic materials as listed in Table 5 were prepared. Characteristics of the prepared amorphous oxide magnetic materials are also listed in Table 5.

Figure 13:
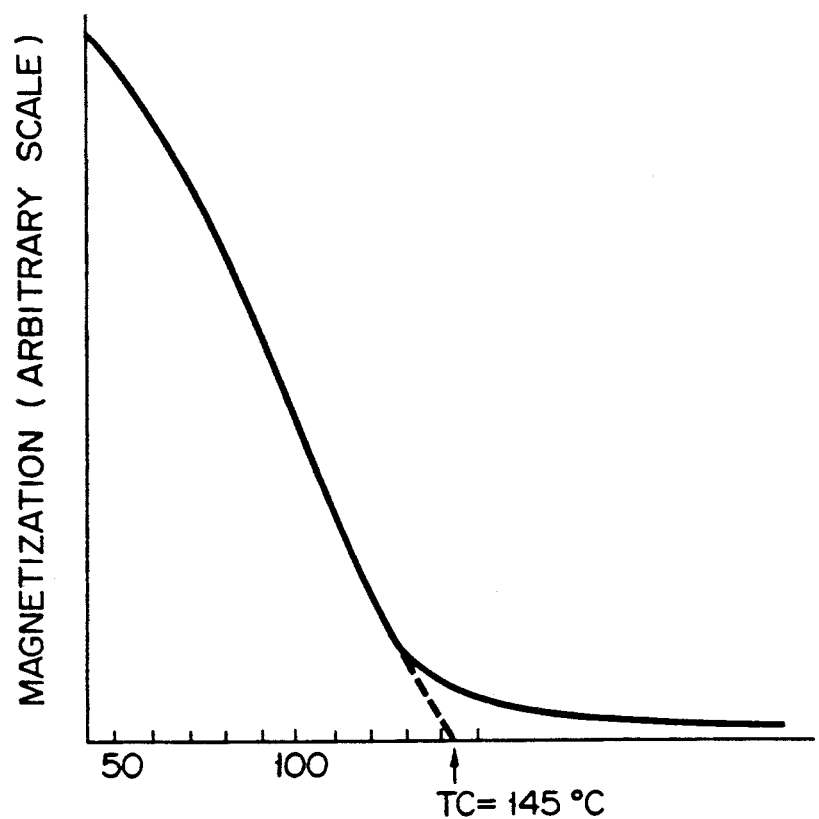
Figure 14:
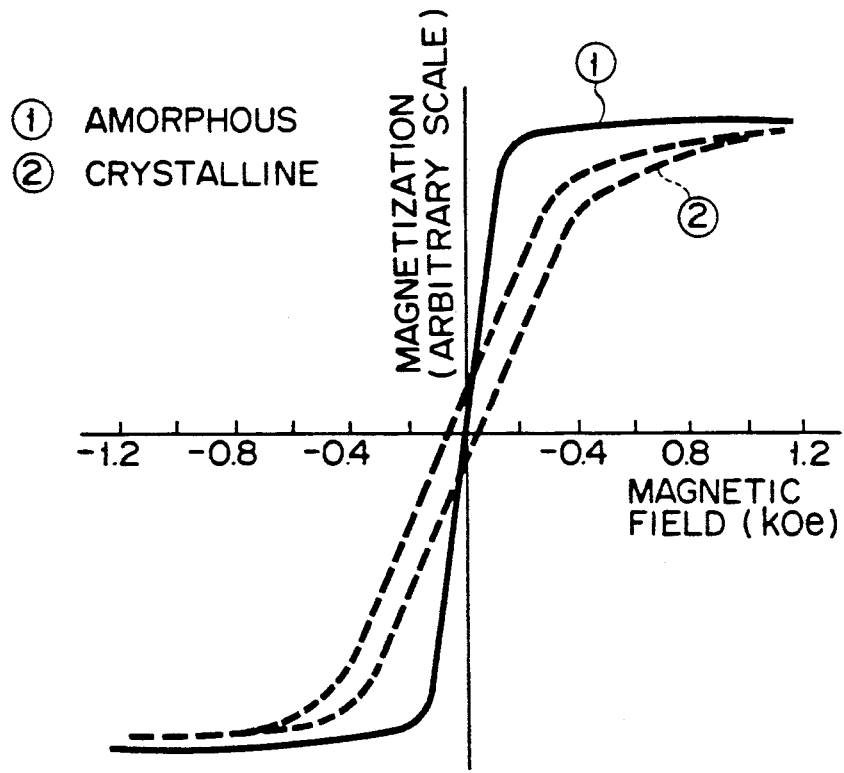

Following the same procedures as in Example 2, amorphous oxide magnetic material thin films were prepared. The results and characteristics of the thin films are listed in Table 6. FIG. 12 is a graph showing X-ray diffraction of Sample 51. As is apparent from FIG. 12, the sample had an amorphous structure. FIG. 13 is a graph showing a change in magnetization with respect to temperature of Sample 51 measured by a VSM. FIG. 14 is a graph showing a magnetization curve of Sample 57 measured by a VSM as compared with that of crystalline $La_{0.7}Sr_{0.3}MnO_3$. As is apparent from FIG. 14, rise of magnetization of the sample of the present invention was faster, and its magnetic coercive force was significantly smaller. FIG. 15 is a graph showing a DTA measurement result of Sample 60. As is apparent from FIG. 15, a crystallization temperature of the sample was as very high as 660° C. FIG. 16 is a graph showing light transmissivity of Sample 67. As is apparent from FIG. 16, the light transmissivity was high from a visible light range to an infrared range.

TABLE 5

| Sample No. | Composition | Magnetization at. R. T. (emu/g) | Curie point (°C.) |
|---|---|---|---|
| 51 | $0.7 [La_{0.7} Sr_{0.3} MnO_3].0.3V_2O_5$ | 18 | 145 |
| 52 | $0.6 [La_{0.7} Sr_{0.3} MnO_3].0.4GeO_2$ | 19 | 150 |
| 53 | $0.5 [La_{0.7} Sr_{0.3} MnO_3].0.5Bi_2O_5$ | 20 | 155 |
| 54 | $0.6 [La_{0.8} Sr_{0.2} MnO_3].0.4MgO$ | 19 | 158 |
| 55 | $0.6 [La_{0.7} Sr_{0.3} MnO_3].0.2B_2O_3.0.2SiO_2$ | 16 | 140 |
| 56 | $0.6 [La_{0.7} Sr_{0.3} MnO_3].0.2B_2O_3.0.2MoO_3$ | 15 | 130 |
| 57 | $0.6 [La_{0.7} Sr_{0.3} MnO_3].0.2B_2O_3.0.2ZnO$ | 18 | 155 |
| 58 | $0.6 [La_{0.7} Sr_{0.3} MnO_3].0.2B_2O_3.0.2Bi_2O_3$ | 23 | 153 |
| 59 | $0.5 [La_{0.7} Ba_{0.3} MnO_3].0.3B_2O_3.0.2Bi_2O_3$ | 20 | 150 |
| 60 | $0.5 [La_{0.7} Ca_{0.3} MnO_3].0.3B_2O_3.0.2Bi_2O_3$ | 17 | 140 |
| 61 | $0.5 [La_{0.7} Sr_{0.3} MnO_3].0.45 B_2O_3.0.05Bi_2O_3$ | 25 | 160 |
| 62 | $0.5 [La_{0.2} Sr_{0.8} MnO_3].0.5P_2O_5$ | 22 | 140 |

TABLE 6

| Sample No. | Composition | Magnetization at. R. T. (emu/g) | Curie point (°C.) |
|---|---|---|---|
| 63 | $0.9 [La_{0.7} Sr_{0.3} MnO_3].0.1SiO_2$ | 35 | 165 |
| 64 | $0.9 [La_{0.7} Sr_{0.3} MnO_3] 0.1MgO$ | 35 | 165 |
| 65 | $0.5 [La_{0.7} Sr_{0.3} MnO_3] 0.1 MoO_3$ | 30 | 160 |
| 66 | $0.9 [La_{0.7} Sr_{0.3} MnO_3] 0.1ZnO$ | 35 | 165 |
| 67 | $0.8 [La_{0.7} Ba_{0.3} MnO_3].0.1B_2O_3.0.1Bi_2O_3$ | 37 | 160 |

EXAMPLE 5

Figure 17:
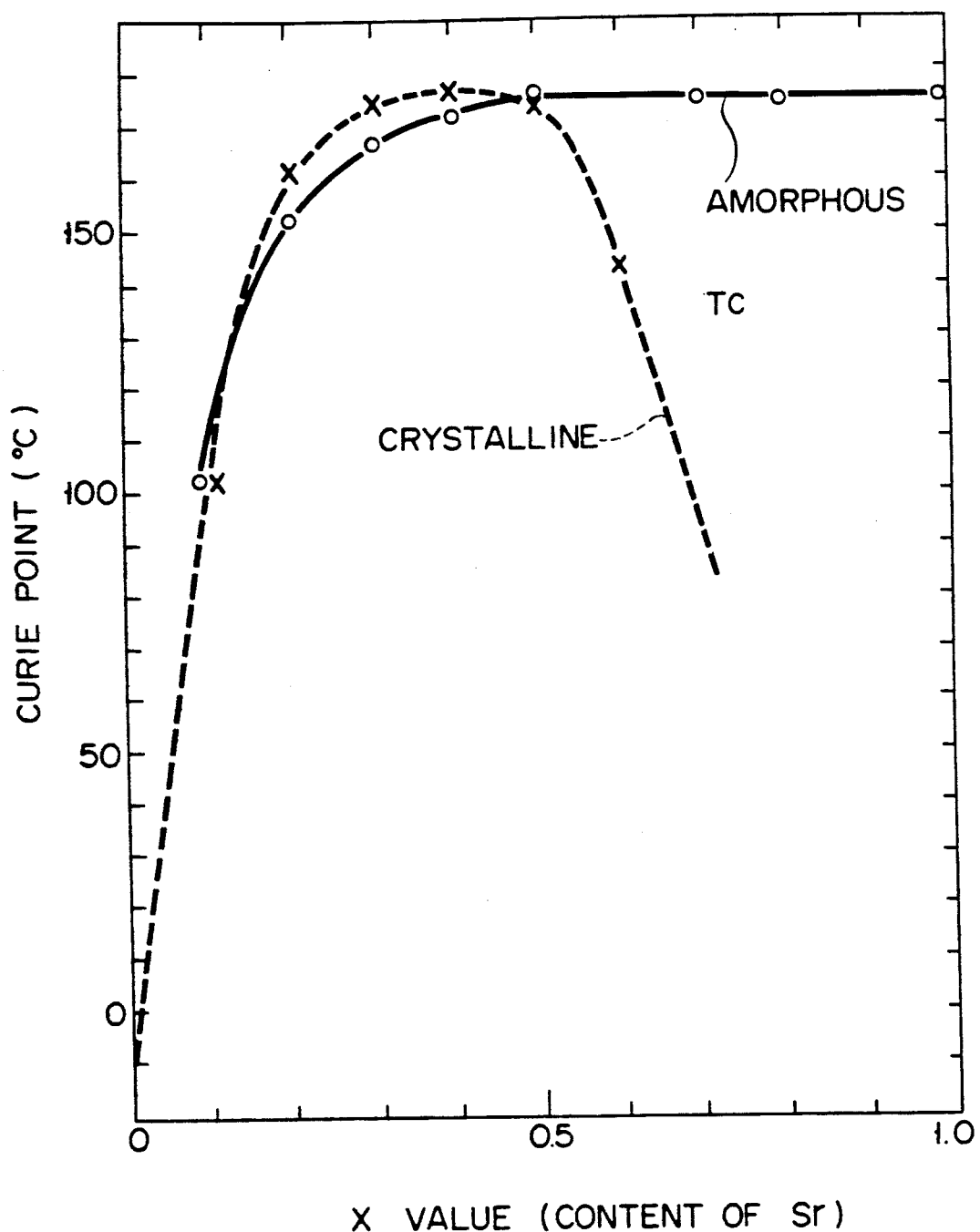
FIG. 17 is a graph showing composition dependency of a Curie point of an amorphous oxide magnetic material according to an example of the present invention as compared with a crystalline oxide.

Following the same procedures as in Example 1, $0.6La_{1-x}Sr_xMnO_3 \cdot 0.4B_2O_3$ amorphous oxide magnetic materials were prepared. FIG. 17 shows an Sr dependency solid curve of Curie points of the materials measured by a VSM as compared with an Sr dependency dotted curve of Curie points of crystalline sintered bodies $La_{1-x}Sr_xMnO_3$. As is apparent from FIG. 17, a change in Curie point with respect to Sr content of the amorphous material was smooth, and the Curie point of the amorphous material was much higher than that of the crystalline one in an Sr rich region.

EXAMPLE 6

Using the same composition of $0.5[La_{0.7}Sr_{0.3}MnO_3]\cdot 0.5B_2O_3$ as that used in Example 1, an amorphous state was checked when the thickness was changed.

Figure 18:
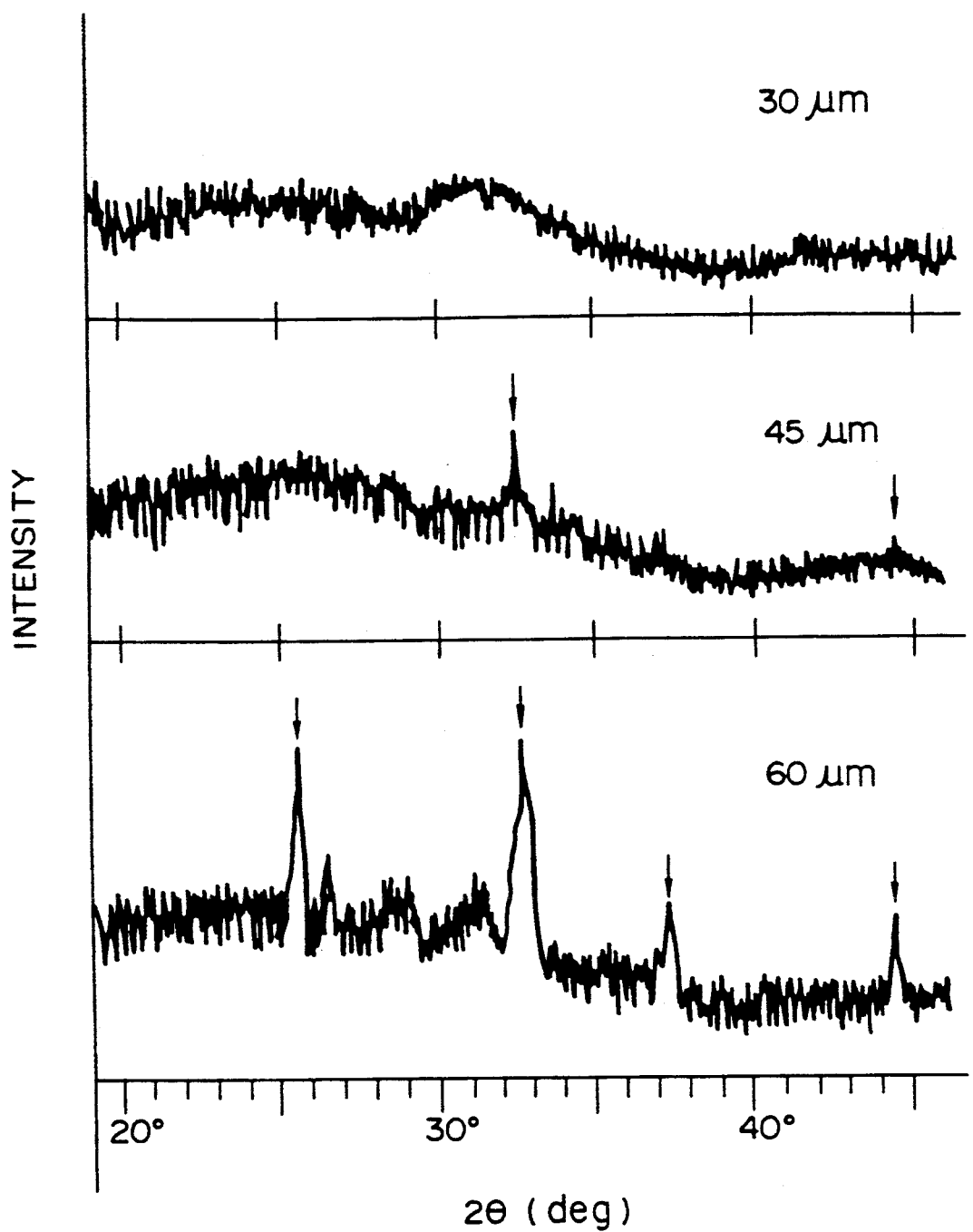

FIG. 18 shows X-ray diffraction results. When the thickness was 30 μm, a completely amorphous state was obtained. However, when the thickness was 60 μm, crystals were found, and when the thickness was 60 μm, the presence of crystals was significant.

As a result of checking a number of samples, it was confirmed that the thickness of 40 μm or less was preferable in order to obtain an amorphous state.

EXAMPLE 7

Ribbon-like amorphous oxides prepared following the same procedures as in Example 1 were milled by a ball mill to form powders each having an average grain size of 5 μm. Each powder was mixed with a glass powder at a mixing ratio of 9:1 (wt %) and molded into a shape of $10 \times 8 \times 3^t$ by metal molds. Then, the resultant molded product was heated at 400° C. for 30 minutes, and its permeability was measured. The permeability was measured by an LCR meter. Table 7 shows values of initial permeability at 1 MHz. As is apparent from Table 7, a magnetic core of the present invention has high permeability and this can be used as a magnetic core material.

Table 7 shows the values obtained when $B_2O_3$ and La were used as XO and R, respectively. However, similar values were measured when other XO and R were used.

TABLE 7

| Sample No. | Conmposition | initial permeability at 1 MHz |
|---|---|---|
| 71 | $0.7 [La_{0.7} Sr_{0.3} MnO_3].0.3(B_2O_3)$ | 4200 |
| 72 | $0.6 [La_{0.7} Sr_{0.3} MnO_3].0.4(B_2O_3)$ | 4000 |
| 73 | $0.5 [La_{0.7} Sr_{0.3} MnO_3].0.5(B_2O_3)$ | 4100 |
| 74 | $0.6 [La_{0.9} Sr_{0.1} MnO_3].0.4(B_2O_3)$ | 3900 |
| 75 | $0.6 [La_{0.5} Sr_{0.5} MnO_3].0.4(B_2O_3)$ | 4100 |
| 76 | $0.7 [La_{0.7} Ba_{0.3} MnO_3].0.3(B_2O_3)$ | 3800 |
| 77 | $0.6 [La_{0.7} Ba_{0.3} MnO_3].0.4(B_2O_3)$ | 3800 |
| 78 | $0.5 [La_{0.7} Ba_{0.3} MnO_3].0.5(B_2O_3)$ | 3900 |
| 79 | $0.6 [La_{0.8} Ba_{0.2} MnO_3].0.4(B_2O_3)$ | 3900 |
| 80 | $0.6 [La_{0.5} Ba_{0.5} MnO_3].0.4(B_2O_3)$ | 3800 |
| 81 | $0.7 [La_{0.7} Ca_{0.3} MnO_3].0.3(B_2O_3)$ | 3600 |
| 82 | $0.6 [La_{0.7} Ca_{0.3} MnO_3].0.4(B_2O_3)$ | 3600 |
| 83 | $0.5 [La_{0.7} Ca_{0.3} MnO_3].0.5(B_2O_3)$ | 3900 |
| 84 | $0.5 [La_{0.7} Pb_{0.5} MnO_3].0.5(B_2O_3)$ | 3500 |

EXAMPLE 8

1-μm thick amorphous oxide thin films were formed by sputtering following the same procedures as in Example 1, and permeability of each film was measured by a yoke method. That is, a magnetic circuit was formed by a yoke consisting of the above film and a ferrite core, a coil was wound 10 times, and the permeability was measured by a digital impedance meter. Table 8 shows values of the permeability at 1 MHz. As is apparent from Table 8, all the values were high.

TABLE 8

| Sample No. | Composition | initial permeability at 1 MHz |
|---|---|---|
| 91 | $La_{0.7} Sr_{0.3} MnO_3$ | 5000 |
| 92 | $0.9 [La_{0.7} Sr_{0.7} MnO_3].0.1(B_2O_3)$ | 4900 |
| 93 | $0.8 [La_{0.7} Sr_{0.7} MnO_3].0.2(B_2O_3)$ | 4800 |
| 94 | $La_{0.7} Ba_{0.3} MnO_3$ | 4500 |
| 95 | $0.9 [La_{0.8} Ba_{0.2} MnO_3].0.1(B_2O_3)$ | 4500 |
| 96 | $0.8 [La_{0.8} Ba_{0.2} MnO_3].0.2(B_2O_3)$ | 4400 |
| 97 | $La_{0.7} Ca_{0.3} MnO_3$ | 4300 |
| 98 | $0.9 [La_{0.9} Ca_{0.1} MnO_3].0.1(B_2O_3)$ | 4200 |
| 99 | $0.8 [La_{0.9} Ca_{0.1} MnO_3].0.2(B_2O_3)$ | 4200 |
| 100 | $0.7 [SrMnO_3].0.3B_2O_3$ | 4800 |

EXAMPLE 9

Amorphous oxide magnetic material thin films were prepared by sputtering following the same procedures as in Example 1. Table 9 shows a composition, magnetization at room temperature, a Curie point, and a magnetic coercive force characteristic of each thin film. The film was a perpendicular magnetic film having an axis of easy magnetization in a direction perpendicular to the film surface.

When the Faraday rotational angles of amorphous magnetic oxides listed in Table 9 were measured, all values were as large as $10^4$ degree/cm or more.

As has been described above, the amorphous oxide magnetic material of the present invention has an axis of easy magnetization in a direction perpendicular to the film surface and a large magnetic coercive force. In addition, a Curie point of the amorphous oxide magnetic material according to the present invention is suitably high, its Faraday rotational angle is large, and its noise component is small because it is amorphous. Therefore, the amorphous oxide magnetic material of the present invention can be applied to an information recording medium having a high C/N ratio such as a magneto-optical recording medium or thermal transfer recording medium. In addition, a magnetic material thin film recording medium prepared by the composition of the present invention has good corrosion resistance and thermal stability.

TABLE 9

| Sample No. | Composition | Magnetization at R. T. (emu/g) | Curie point (°C.) | Coercive force (kOe) |
|---|---|---|---|---|
| 101 | $La_{0.7} Sr_{0.3} Mn_{0.7} Co_{0.3} O_3$ | 38.0 | 170 | 1.2 |
| 102 | $0.9 [La_{0.7} Sr_{0.3} Mn_{0.7} Co_{0.3} O_3].(B_2O_3)$ | 35.5 | 170 | 1.2 |
| 103 | $0.8 [La_{0.7} Sr_{0.3} Mn_{0.7} Co_{0.3} O_3].(B_2O_3)$ | 31.5 | 165 | 1.5 |
| 104 | $La_{0.7} Ba_{0.3} Mn_{0.7} Co_{0.3} O_3$ | 35.0 | 140 | 1.1 |
| 105 | $0.9 [La_{0.7} Ba_{0.3} Mn_{0.7} Co_{0.3} O_3].0.1(B_2O_3)$ | 33.0 | 135 | 1.1 |
| 106 | $0.8 [La_{0.7} Ba_{0.3} Mn_{0.7} Co_{0.3} O_3].0.2(B_2O_3)$ | 30.5 | 135 | 1.1 |
| 107 | $La_{0.7} Ca_{0.3} Mn_{0.7} Co_{0.3} O_3$ | 35.0 | 120 | 1.2 |
| 108 | $0.9 [La_{0.7} Ba_{0.3} Mn_{0.7} Co_{0.3} O_3).0.1(B_2O_3)$ | 32.5 | 115 | 1.0 |
| 109 | $0.8 [La_{0.7} Ba_{0.3} Mn_{0.7} Co_{0.3} O_3).0.2(B_2O_3)$ | 30.0 | 110 | 1.0 |
| 110 | $0.8 [La_{0.4} Dy_{0.2} Sr_{0.4} MnO_3].0.2(B_2O_3)$ | 28.0 | 160 | 1.7 |
| 111 | $0.8 [La_{0.4} Tb_{0.2} Sr_{0.4} MnO_3].0.2(B_2O_3)$ | 25.0 | 140 | 1.9 |
| 112 | $0.8 [La_{0.4} Ho_{0.2} Sr_{0.4} MnO_3].0.2(B_2O_3)$ | 24.0 | 140 | 1.8 |

TABLE 9-continued

| Sample No. | Composition | Magnetization at. R. T. (emu/g) | Curie point (°C.) | Coercive force (kOe) |
|---|---|---|---|---|
| 113 | $0.8 \, [La_{0.4} \, Sm_{0.2} \, Sr_{0.4} \, MnO_3] \cdot 0.2(B_2O_3)$ | 31.0 | 150 | 1.5 |
| 114 | $0.8 \, [La_{0.4} \, Sm_{0.2} \, Sr_{0.4} \, MnO_3] \cdot 0.2(Bi_2O_3)$ | 30.0 | 160 | 1.4 |

What is claimed is:

1. An amorphous oxide ferromagnetic material consisting essentially of the following components:
    at least one element represented by Ln selected from the group consisting of Y and rare earth elements;
    at least one element represented by A selected from the group consisting of Ca, Sr, Ba, and Pb; Mn;
    at least one element represented by X selected from the group consisting of B, Bi, Si, Mg, Mo, V, Zn, P and Ge; and oxygen,
    the proportions of said components corresponding to the formula:

$(1-y)[Ln_{1-x}A_xMnO_{3-\delta}] \cdot y[XO]$ wherein XO is an oxide of said X and is calculated in terms of $B_2O_3$, $SiO_2$, MgO, $MoO_3$, $V_2O_5$, ZnO, $P_2O_5$, or $GeO_2$, and $\delta$ is oxygen deficiency equal to or less than 1, x and y fall within the ranges of $0.1 \leq x \leq 0.8$ and $y \leq 0.7$; respectively.

2. A material according to claim 1, wherein $0.1 \leq x \leq 0.6$.

3. A material according to claim 1, wherein $0.1 \leq y \leq 0.5$.

4. A material according to claim 1, wherein $0.2 \leq y \leq 0.5$.

5. A material according to claim 1, wherein said Ln contains La.

6. A material according to claim 5, wherein said Ln contains not less than 50 at % of La, based on Ln.

7. A material according to claim 6, wherein said Ln contains not less than 70 at % of La, based on Ln.

8. A material according to claim 1, wherein said XO contains $B_2O_3$.

9. A material according to claim 8, wherein said XO contains not less than 30 mol % of $B_2O_3$ based on XO.

10. A material according to claim 9, wherein said XO contains not less than 50 mol % of $B_2O_3$ based on XO.

11. A material according to claim 1, wherein said XO contains not less than 5 mol % of $Bi_2O_3$ based on XO.

12. A material according to claim 1, wherein said A contains Sr.

13. A material according to claim 12, wherein said A contains not less than 50 at % of Sr, based on A.

14. A material according to claim 13, wherein said A contains not less than 70 at % of Sr, based on A.

15. A material according to claim 1, wherein not more than 50 at % of Mn in said amorphous oxide ferromagnetic material are substituted by Co.

16. A magnetic core including an amorphous oxide ferromagnetic material consisting essentially of the following components:
    at least one element represented by Ln selected from the group consisting of Y and rare earth elements;
    at least one element represented by A selected from the group consisting of Ca, Sr, Ba, and Pb; Mn;
    at least one element represented by X selected from the group consisting of B, Bi, Si, Mg, Mo, V, Zn, P and Ge; and oxygen,
    the proportions of said components corresponding to the formula:

$(1-y)[Ln_{1-x}A_xMnO_{3-\delta}] \cdot y[XO]$ wherein XO is an oxide of said X and is calculated in terms of $B_2O_3$, $SiO_2$, MgO, $MoO_3$, $V_2O_5$, ZnO, $P_2O_5$, or $GeO_2$, and $\delta$ is oxygen deficiency equal to or less than 1, x and y fall within the ranges of $0.1 \leq x \leq 0.8$ and $y \leq 0.7$; respectively.

17. An information recording medium including an amorphous oxide ferromagnetic material consisting essentially of the following components:
    at least one element represented by Ln selected from the group consisting of Y and rare earth elements;
    at least one element represented by A selected from the group consisting of Ca, Sr, Ba, and Pb; Mn;
    at least one element represented by X selected from the group consisting of B, Bi, Si, Mg, Mo, V, Zn, P and Ge; and oxygen,
    the proportions of said components corresponding to the formula:

$(1-y)[Ln_{1-x}A_xMnO_{3-\delta}] \cdot y[XO]$ wherein XO is an oxide of said X and is calculated in terms of $B_2O_3$, $SiO_2$, MgO, $MoO_3$, $V_2O_5$, ZnO, $P_2O_5$, or $GeO_2$, and $\delta$ is oxygen deficiency equal to or less than 1, x and y fall within the range of $0.1 \leq x \leq 0.8$ and $y \leq 0.7$; respectively.

18. A medium according to claim 17, wherein not more than 50 at % of Mn in said amorphous oxide magnetic material are substituted by Co.

* * * * *

UNITED STATES PATENT AND TRADEMARK OFFICE
CERTIFICATE OF CORRECTION

PATENT NO. : 5,068,050
DATED     : November 26, 1991
INVENTOR(S) : Koichiro Inomata et al.

It is certified that error appears in the above-identified patent and that said Letters Patent is hereby corrected as shown below: On the title page:

The third inventor has been omitted, should be, --Shiho Nakamura, Tokyo, Japan--.

Signed and Sealed this

First Day of June, 1993

Attest:

MICHAEL K. KIRK

Attesting Officer

Acting Commissioner of Patents and Trademarks